Patented Nov. 6, 1928.

1,690,876

UNITED STATES PATENT OFFICE.

WILHELM PUNGS, OF LUDWIGSHAFEN-ON-THE-RHINE, AND MICHAEL JAHRSTORFER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

PROCESS OF IMPROVING THE PROPERTIES OF MONTAN WAX.

No Drawing. Application filed September 10, 1927, Serial No. 218,853, and in Germany September 13, 1926.

A process for improving the properties of Montan wax has been suggested according to which the wax, in the crude state or after having been freed from resins, is treated with chromic acid, or mixtures containing the same, in the presence of glacial acetic acid.

We have now found that the treatment with chromic acid or mixtures containing the same in the presence of glacial acetic acid may be carried out in a highly effective manner if small quantities of sulfuric acid, or acid salts of sulfuric or other acids, such as acid potassium or acid sodium sulfate or monosodium phosphate; or both together, be added to the glacial acetic acid. By means of these additions, an almost snow-white product is obtained, without its wax character being impaired. According to this process no carbonizing effect on the Montan wax is produced by the concentrated sulfuric acid, nor any saponification of the wax, which would partially spoil its most valuable properties. The product may be mixed with other waxes or wax-like substances, and especially with those which are obtained by the oxidation of paraffin hydrocarbons.

The following example will further illustrate how the said invention may be carried into practical effect but the invention is not limited thereto.

*Example.*

500 grams of crude or de-resinified Montan wax are heated with about 1 kilogram of glacial acetic acid to which from 10 to 20 cubic centimetres of concentrated sulfuric acid are added. An aqueous solution, as concentrated as possible, of 500 grams of chromic acid is then slowly added, stirring being preferably afterwards continued, accompanied by boiling the mixture, for some time. The mixture is then poured into hot water, and the cake of bleached wax is removed after cooling.

The procedure is similar when sodium bisulfate, for example is used.

By the said treatment the Montan wax is purified without losing its valuable properties and at the same time bleached, but these improvements are not the only ones obtained.

What we claim is:

1. The process of improving the properties of Montan wax which consists in treating Montan wax with chromic acid in the presence of glacial acetic acid and small quantities of an acid substance selected from the group consisting of sulfuric acid and acid salts of polybasic acids.

2. The process of improving the properties of Montan wax which consists in treating Montan wax with chromic acid in the presence of glacial acetic acid and small quantities of sulfuric acid.

3. The process of improving the properties of Montan wax which consists in boiling Montan wax with a concentrated aqueous solution of chromic acid in the presence of glacial acetic acid and sulfuric acid, the ingredients being used in the proportions by weight of 50 parts of Montan wax to 100 parts of glacial acetic acid to form 1 to 4 parts of concentrated sulfuric acid to 50 parts of chromic acid.

In testimony whereof we have hereunto set our hands.

WILHELM PUNGS.
MICHAEL JAHRSTORFER.